US006223882B1

(12) United States Patent
Dumenil

(10) Patent No.: US 6,223,882 B1
(45) Date of Patent: May 1, 2001

(54) LOADING AND/OR OFFLOADING DEVICE, IN PARTICULAR FOR PRINTING MACHINES

(75) Inventor: François Dumenil, Chevry Cossigny (FR)

(73) Assignee: Societe d'Exploitation des Machines Dubuit, Noisy le Grand (FR)

(*) Notice: Subject to any disclaimer, the term of this patent is extended or adjusted under 35 U.S.C. 154(b) by 0 days.

(21) Appl. No.: 09/258,393

(22) Filed: Feb. 26, 1999

(30) Foreign Application Priority Data

Feb. 27, 1998 (FR) ........ 98 02412
Feb. 27, 1998 (FR) ........ 98 02413

(51) Int. Cl.[7] ........ B65G 47/24
(52) U.S. Cl. ........ 198/377.03; 198/409
(58) Field of Search ........ 198/377.03, 375, 198/409, 410

(56) References Cited

U.S. PATENT DOCUMENTS

| | | | | |
|---|---|---|---|---|
| 3,648,821 | | 3/1972 | Rudolph et al. | 198/33 |
| 4,073,376 | * | 2/1978 | Krooss | 198/498 |
| 4,164,279 | * | 8/1979 | Dubuit | 198/463.6 |
| 4,176,598 | | 12/1979 | Dubuit | 198/33 |
| 4,874,078 | * | 10/1989 | Meyer | 198/409 |
| 4,925,000 | * | 5/1990 | Pacakova et al. | 198/409 |
| 5,013,213 | * | 5/1991 | Roberts et al. | 198/409 |
| 5,220,990 | * | 6/1993 | YoungOCheol | 198/409 |
| 5,249,663 | * | 10/1993 | Mccoy et al. | 198/409 |
| 5,291,984 | | 3/1994 | Lusetti | 198/408 |
| 5,333,720 | * | 8/1994 | Zwigart et al. | 198/409 |
| 5,427,225 | * | 6/1995 | Namba | 198/409 |
| 5,960,930 | * | 10/1999 | Hawkins | 198/577 |

FOREIGN PATENT DOCUMENTS 2368359 10/1976 (FR) ........ B41F/17/14

* cited by examiner

*Primary Examiner*—Robert P. Olszewski
*Assistant Examiner*—Paul T. Chin
(74) *Attorney, Agent, or Firm*—Young & Thompson

(57) ABSTRACT

In a loading and/or offloading device, a transfer member includes two jaws, one of which is fixed and the other of which is mobile, for picking up an object. The mobile jaw is mounted to be mobile under the control of an actuator including a compensator spring arrangement, the tension in which is variable. The transfer member is carried by a carriage and is slaved to a tilting system operated mechanically by the carriage. Applications include printing machines.

28 Claims, 5 Drawing Sheets

F/G. 7
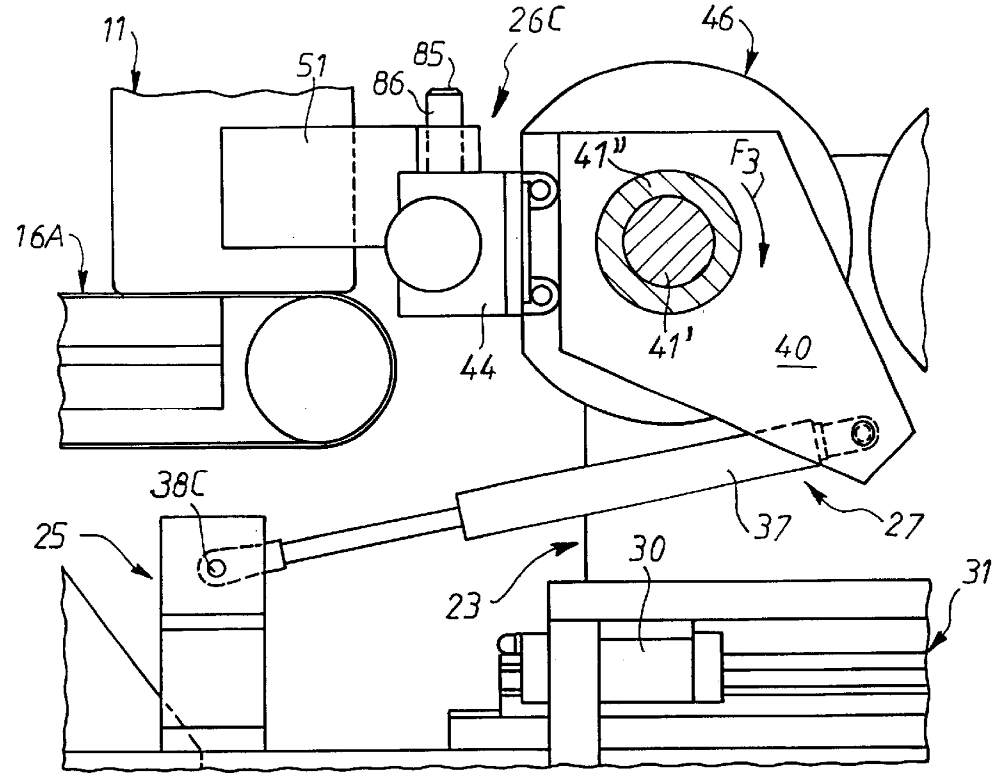
F/G. 8
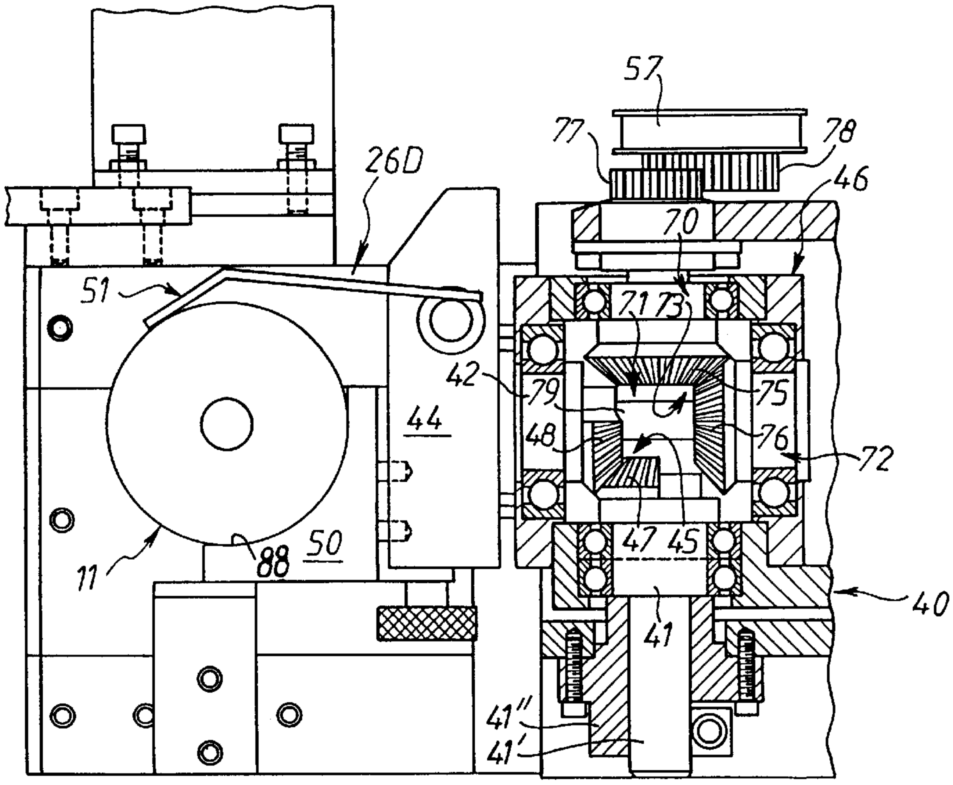

LOADING AND/OR OFFLOADING DEVICE, IN PARTICULAR FOR PRINTING MACHINES

BACKGROUND OF THE INVENTION

1. Field of the Invention

The present invention is generally concerned with automatic loading and/or offloading of a machine of any kind including at least one processing station to which objects to be processed must be presented one by one.

It is more particularly, but not necessarily exclusively, directed to the situation in which the machine is a printing machine, for example a silkscreen printing machine.

2. Description of the Prior Art

With an eye on productivity, machines of this kind are frequently serviced by at least one conveyor.

There are usually two conveyors, a feed conveyor on the upstream side of the processing station and an evacuation conveyor on the downstream side of the station.

A loading and/or offloading device is also provided for automatically transferring an object to be processed from the feed conveyor to the processing station, for automatic loading of the processing station, and/or transferring a processed object from the processing station to the evacuation conveyor, for automatic offloading of the processing station.

The loading and/or off loading device used in this case therefore comprises at least one transfer member adapted to pick up an object.

The present invention is more particularly directed to the situation in which a transfer member of the above kind has two jaws for holding the object, namely a fixed jaw and a jaw that is mobile relative to the fixed one and which, during an operating cycle of the machine, is alternately closed to pick up an object by cooperating with the fixed jaw to grip the object and opened to release the object.

From one production run to another the objects to be processed may have different configurations and it is important for the transfer member to be easily and quickly adapted to suit the objects without risk of damaging them.

A first object of the invention is an arrangement that satisfies this requirement in a very simple and effective manner.

SUMMARY OF THE INVENTION

In that arrangement, the present invention more precisely consists in a loading and/or offloading device for a machine including a processing station to which objects to be processed must be presented one by one, the loading and/or offloading device including at least one transfer member which includes two jaws for picking up an object, one of which jaws is fixed and the other of which is mobile, wherein the mobile jaw of the transfer member is mounted to be mobile under the control of an actuator including compensator spring means, the tension in which can be adjusted.

Accordingly, from one production run to another, all that is required is to operate on the tension in the compensator spring means so that, when an object is picked up, the force with which the object is gripped by virtue of being clamped between the mobile jaw and the fixed jaw will not lead to any deterioration of the object compromising its integrity.

Moreover, the objects to be processed are handled one by one by a holding device which holds them during printing, when the processing station is a printing station in a printing machine.

It is therefore important for the objects to be processed to be presented to the processing station with a particular orientation that corresponds to that of the holding device.

In practice, in the case of a silkscreen printing machine, each object to be processed then extends along a horizontal axis.

In contrast, when, with an eye on productivity, machines of the kind in question are serviced by two conveyors, a feed conveyor and an evacuation conveyor, the objects to be processed, on the one hand, and the processed objects, on the other hand, both usually extend thereon along a vertical axis.

This is the case, in particular, when the objects are bottles.

Thus, when, still with an eye on productivity, a loading and/or offloading device is used at the processing station concerned and automatically takes the objects to be processed one by one from the feed conveyor, then offers the object to the holding device of the processing station concerned, and then places it on the evacuation conveyor after it has been processed, it is important for the loading and/or offloading device to be able to provide this change of orientation. A loading and/or offloading device for this purpose has been proposed that includes a carriage which is mounted to reciprocate on a frame under the control of translation actuator means, at least one transfer member carried by the carriage and adapted to pick up and to release an object, and tilting means to which the transfer member is slaved and which are able to move the transfer member from a first orientation, in which the picked up object extends along a first axis, to a second orientation, in which the picked up object extends along a second axis which is different from the first axis and which in practice is perpendicular to the plane defined by the first axis and an intermediate axis orthogonal to it.

Two transfer members operating concomitantly are usually provided side by side, one for loading and the other for offloading.

Be this as it may, in prior art loading and/or offloading devices the tilting means of the transfer member(s) are usually controlled individually.

U.S. Pat. No. 4,176,598 describes a loading and/or offloading device in which, in contrast, the tilting means are operative entirely because of the effect of movement of the carriage, which is to the benefit of productivity.

The above loading and/or offloading device is satisfactory and may continue to be so.

However, it has the drawback of being adapted only to use a transfer member of a particular type, in this instance a transfer member in which the picked up object is held by suction.

The present invention also consists of an arrangement which, in contrast, enables the use of another type of transfer member, if required, and which also has other advantages.

In accordance with this arrangement, the present invention consists of a loading and/or offloading device for a machine including a processing station to which objects to be processed must be presented one by one, said loading and/or offloading device including a carriage which is mounted to reciprocate on a frame under the control of translation drive means, at least one transfer member carried by said carriage adapted to pick up and to release an object, and tilting means to which said transfer member is slaved and which, due exclusively to the effects of movement of said carriage, are adapted to move said transfer member from a first orientation in which said object picked up extends along a first axis to a second orientation in which said object picked up extends along a second axis perpendicular to the plane that said first axis defines with an intermediate axis orthogonal to it, in which device said tilting means for said transfer member include a link articulated to said frame, a crank mounted to rotate about a first shaft end prevented from rotating on said carriage and articulated to said link, a second shaft end orthogonal to said first shaft end and mounted to rotate relative to said crank, and a base carried by said second shaft end, carrying said transfer member and with a bevel gear operating in the manner of an epicyclic gear between said two shaft ends.

Accordingly, and in accordance with the invention, the movement in translation of the carriage brings about the change in the orientation of the transfer member, on the one hand, by means of the crank which, due to the action of the link, causes the transfer member to tilt, and, on the other hand, by the bevel gear which, conjointly with the aforementioned tilting, causes the transfer member to pivot, the bevel gear that carries the shaft end to which is fixed the base carrying the transfer member rolling on that carried by the fixed shaft end as the crank tilts.

Accordingly, if required, the transfer member can be a mechanically operated transfer member, for example, with a gripping or clamping effect, which for some objects at least may be preferable to a transfer member using suction.

Also, if required, the rotation axis of the transfer member can be close to the center of mass of the object picked up, or even pass through its center of mass, which considerably reduces the inertia due to the corresponding lever arm, which is to the benefit of a higher working rate.

The frame of the loading and/or offloading device in accordance with the invention is preferably an individual frame, separate from that of the machine to be equipped, and adapted to be attached to the machine.

Thus the loading and/or offloading device in accordance with the invention is advantageously able to operate when required to do so by the machine, in the manner of a module, which is beneficial to modular design of a machine of this kind.

The transfer member(s) equipping the loading and/or offloading device are preferably removable, like a tool, to make it quick and easy to adapt the loading and/or offloading device to the specific configuration of the objects to be processed.

The features and advantages of the invention will emerge from the following description given by way of example and with reference to the accompanying diagrammatic drawings.

BRIEF DESCRIPTION OF THE DRAWINGS

FIG. 7 shows the detail VII from FIG. 3 to a larger scale.

FIG. 8 shows the detail VIII from FIG. 4 to the same scale as FIG. 7.

DETAILED DESCRIPTION OF THE PREFERRED EMBODIMENT

Figure 1:
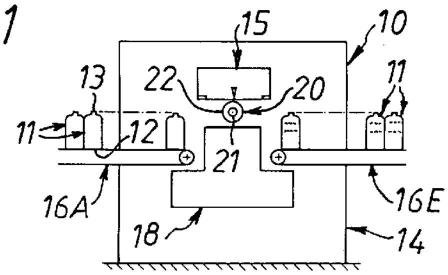
FIG. 1 is an elevation view to a small scale of a machine equipped with a loading and/or off loading device in accordance with the invention.

The figures show, by way of example, application of the invention to the situation in which, on the one hand, the machine 10 concerned is a printing machine and, on the other hand, the objects 11 to be processed are bottles with a bottom 12 and a neck 13.

The machine 10 will not be described here as it is not in itself relevant to the present invention.

Suffice to say that, essentially, in addition to a frame 14, which will not be described in detail, it includes at least one processing station 15, here a printing station, and that it is serviced by a feed conveyor 16A on the upstream side of the processing station 15 and an evacuation conveyor 16E on its downstream side, with a loading and/or offloading device 18 between the conveyors, vertically above the processing station 15.

The processing station 15 is a silkscreen printing station, for example, as shown in FIG. 1.

Figure 5:
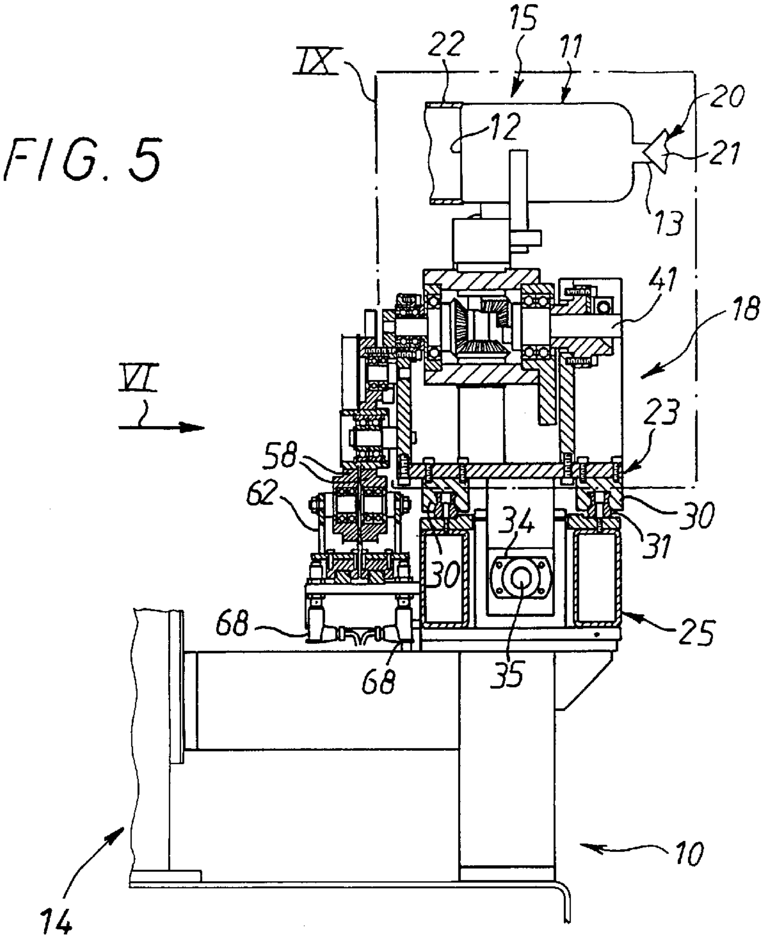
FIG. 5 is a partial view of it in section taken along the broken line V—V in FIG. 3.

Be this as it may, the objects 11 to be processed must be presented to it one by one and they are taken up in turn by a holding device which has a spike 21 and a sleeve 22 that can move axially relative to each other and is able to grip an object 11 by clamping it between the bottom 12 and the neck 13, as seen better in FIG. 5.

In practice the conveyors 16A, 16E are horizontal and the holding device is operative between them.

As shown here, for example, the conveyors 16A, 16E are aligned with each other, but this is not necessarily always the case.

Be this as it may, the objects 11 are conveyed vertically by the conveyors 16A, 16E, with their bottom 12 resting on the conveyor.

The holding device extends horizontally at the processing station 15.

There is therefore a change in the orientation of the objects 11 to be processed from the feed conveyor 16A to the processing station 15 and likewise there is a change of orientation of the processed objects 11 from the processing station 15 to the evacuation conveyor 16E.

The loading and/or offloading device 18 must be able to provide these changes of orientation in addition to the necessary movements.

In a manner that is known per se the loading and/or offloading device 18 in accordance with the invention includes, for this purpose, a carriage 23 which is mounted to reciprocate on a frame under the control of translation control means 24, at least one transfer member 26C, 26D carried by the carriage 23 and adapted to pick up an object 11 and to put it down and, as described in more detail hereinafter, tilting means 27 to which the transfer member 26C, 26D is slaved and which are adapted to move the transfer member 26C, 26D from a first orientation in which the picked up object 11 extends along a first axis to a second orientation in which the picked up object 11 extends along a second axis perpendicular to the plane defined by the first axis and an intermediate axis orthogonal to it.

In the embodiment shown the carriage 23 carries two side by side transfer members 26C, 26D, one for loading on the same side as the feed conveyor 16A and the other for offloading on the same side as the evacuation conveyor 16E, tilting means 27 being associated with each of the transfer members 26C, 26D.

In the embodiment shown, therefore, the loading and/or offloading device in accordance with the invention both loads the processing station and offloads it.

Figure 2:
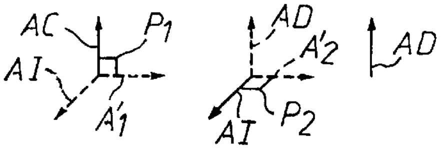
FIG. 2 is a diagram of directions showing how this loading and/or offloading device works.

The orientation diagram in FIG. 2 shows diagrammatically how the corresponding tilting means 27 work.

In the case of the transfer member 26C, which operates between the feed conveyor 16A and the processing station 15, the object 11 to be picked up initially extends along a first axis AC, or loading axis, which is a vertical axis, as symbolized by an arrow in FIG. 2; at the end of its transfer by the carriage 23 it must extend along a second axis AI, or printing axis, which is a horizontal axis, also as symbolized by an arrow in FIG. 2; as shown in dashed line in FIG. 2, the second axis AI is in practice perpendicular to the plane P1 defined by the first axis AC and an intermediate axis A'1 orthogonal to it.

In the case of the transfer member 26D that operates between the processing station 15 and the evacuation conveyor 16E, the object 11 to be picked up initially extends along a first axis which is the horizontal printing axis AI previously mentioned and, at the end of its transfer by the carriage 23, it must extend along a second axis AD which is a vertical axis, as symbolized by an arrow in FIG. 2; as symbolized in dashed line in FIG. 2, the second axis AD is in practice perpendicular to the plane P2 defined by the first axis AI and an intermediate axis A'2 orthogonal to it.

In each instance tilting is combined with pivoting.

Figure 3:
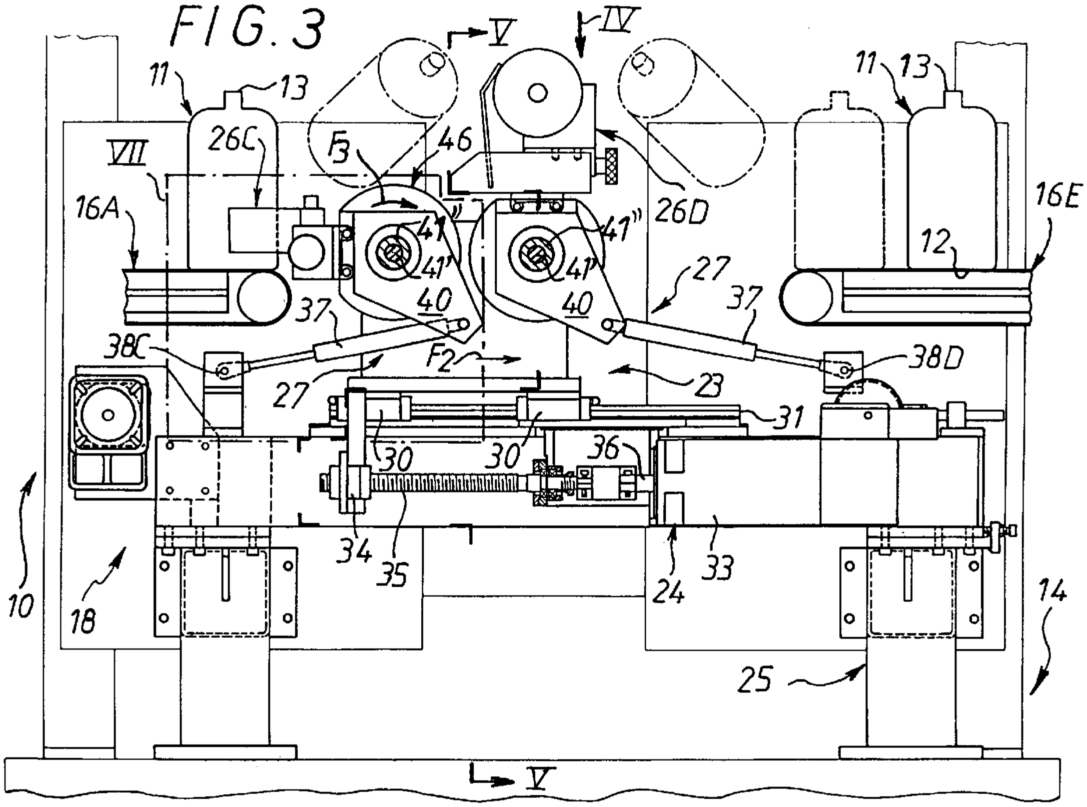
FIG. 3 is a locally cut-away elevation view to a larger scale of the loading and/or offloading device.

FIG. 3 shows illustrative intermediate positions of the objects 11 in chain-dotted line.

As in the embodiment shown, the frame of the loading and/or offloading device 18 in accordance with the invention is preferably an individual frame, separate from the frame 14 of the machine 10, and adapted to be attached thereto.

Being familiar to the skilled person, the frame will not be described in detail here.

Likewise the carriage 23.

Suffice to say, in connection with the carriage 23, that in the embodiment shown it has shoes engaged with elongate rails 31 parallel to the lengthwise direction of the conveyors 16A, 16E and its translation drive means 24 include a digital motor 33.

As usual, in the present context the expression "digital motor" means a digitally controlled motor.

As shown here, for example, the carriage 23 includes a nut 34 meshing with a recirculating ball screw 35 constrained to rotate with the output shaft 36 of the digital motor 33.

In a manner that is known per se, the tilting means 27 of a transfer member 26C, 26D are mechanically operated by the carriage 23 with the result that their intervention is entirely the result of movement of the carriage.

As is the case in the embodiment shown, the tilting means 27 are preferably identical for each of the transfer members 26C, 26D.

In other words, the tilting means 27 associated with the transfer member 26D are identical to the tilting means 27 associated with the transfer member 26C.

The tilting means 27 will therefore be described interchangeably hereinafter with reference to either of the transfer members 2GC, 26D and likewise the drawings show interchangeably the components of the tilting means 27 associated with the transfer member 26C and those of the tilting means 27 associated with the transfer member 26D.

Figure 4:
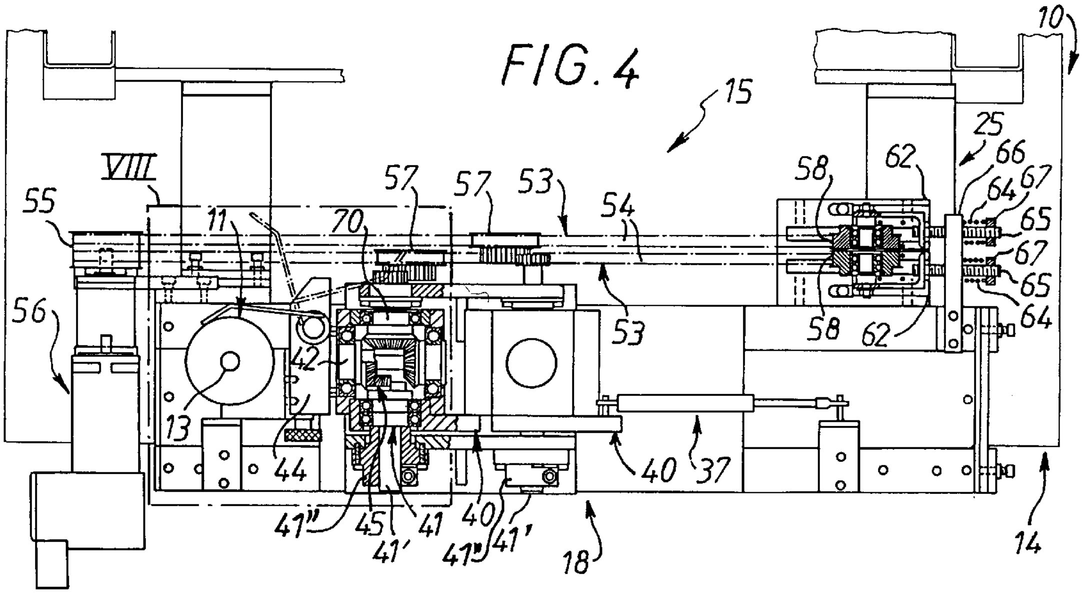
FIG. 4 is a locally cut-away plan view of it as seen in the direction of the arrow IV in FIG. 3.

In accordance with the invention, the tilting means 27 of a transfer member 26C, 26D include a link 37 which is articulated to the frame and therefore at a fixed point 38C in the case of the link 37 associated with the transfer member 26C and a fixed point 38D in the case of the link 37 associated with the transfer member 26D (see FIGS. 3, 4 and 7), a crank 40 mounted to rotate about a first shaft end 41 prevented from rotation on the carriage 23 is articulated to the link 37, a second shaft end 42 orthogonal to the first shaft end 41 is mounted to rotate relative to the crank 40 (see FIGS. 4 and 8) and a base 44 carried by the second shaft end 42 carries the transfer member 26C, 26D concerned with a bevel gear 45 operative in the manner of an epicyclic gear between the two shaft ends 41, 42.

In the case of the link 37 associated with the transfer member 26C the fixed point 38C is on the same side as the feed conveyor 16A and in the case of that associated with the transfer member 26D the fixed point 38D is on the same side as the evacuation conveyor 16E (see FIG. 1).

In practice the first shaft end 41 extends transversely relative to the direction of movement in translation of the carriage 23 and the second shaft end 42 extends parallel to this translation direction.

Figure 9:
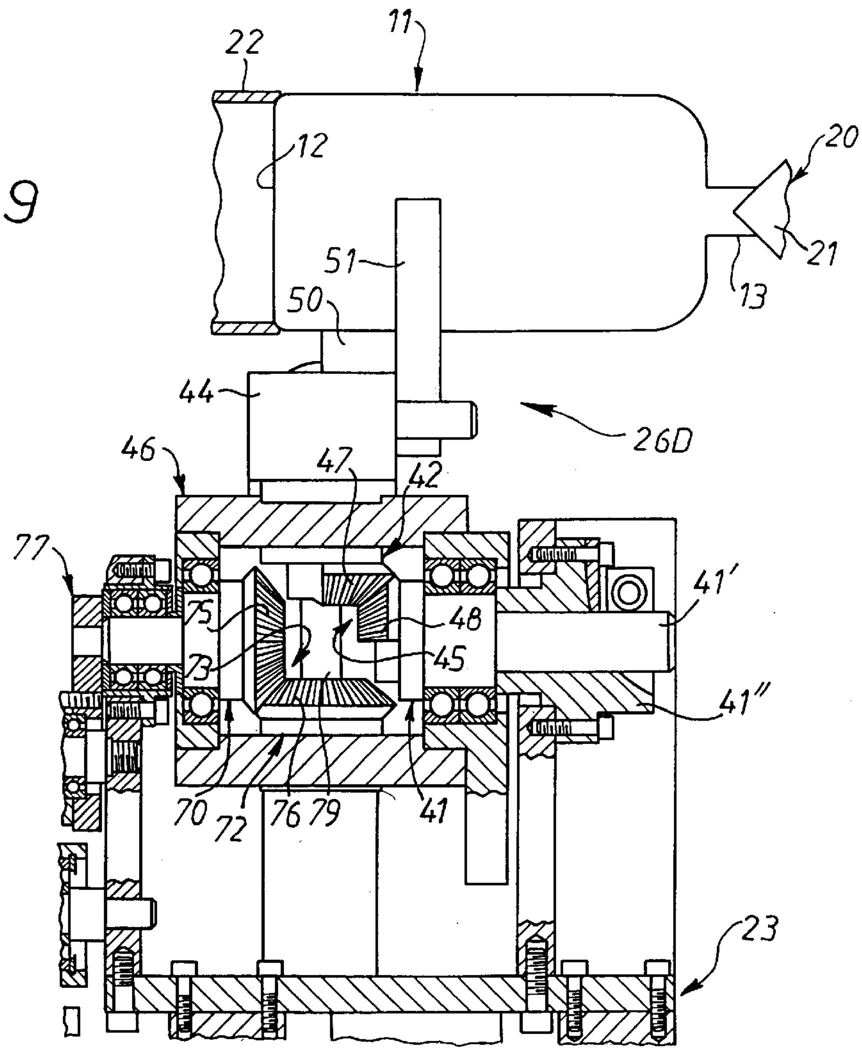
FIG. 9 shows the detail IX from FIG. 5 to the same scale as FIGS. 7 and 8.

To prevent it rotating on the carriage 23, the first shaft end 41 of the embodiment shown has a tail 41' which is gripped in a yoke 41" carried by the carriage 23 (see FIGS. 8 and 9).

The first shaft end 41 therefore has a plurality of sections with different diameters, and likewise the second shaft end 42, in practice.

In the embodiment shown the crank 40 is attached to a chassis 46 in the form of a sleeve or bush which is rotatably mounted on the first shaft end 41 and on which the second shaft end 42 is itself rotatably mounted.

The bevel gear 45 comprises two bevel pinions 47, 48 constrained to rotate with the respective shaft ends 41, 42 and meshing with each other.

How to execute the above arrangements will be evident to the skilled person and will not be described in more detail here.

Suffice to say, however, that for reasons that will become apparent hereinafter, and as shown here, each of the bevel pinions 47, 48 of the bevel gear 45 extends over only part of the circumference.

As is the case in the embodiment shown, the transfer members 26C, 26D are preferably also of the same type, being in practice identical.

As previously, their components are therefore described interchangeably hereinafter with reference to either of them.

In the embodiment shown a transfer member 26C, 26D of this kind has two jaws 50, 51, one of which is fixed and the other of which is mobile.

In accordance with the invention, the mobile jaw 51 is moved by an actuator 53 including compensator spring means 64, the tension in which is variable, these arrangements being described in more detail hereinafter.

In the embodiment shown, the mobile jaw 51 is rotatably mounted and its actuator 53 includes an endless belt 54 running around a plurality of pulleys, namely a motor pulley 55 rotated by rotation drive means 56, a drive pulley 57 with which the mobile jaw 51 is constrained to rotate and at least one jockey wheel 58 which is rotatably mounted on a support block 62 that is mobile in translation against the compensator spring means 64.

In the embodiment shown the actuators 53 of the mobile jaw 51 of the two transfer members 26C, 26D are separate for each of the transfer members 26C, 26D but, in the embodiment shown, they share the same motor pulley 55 and the means 56 for rotating it.

They are also of generally similar construction.

The rotation drive means 56 common to the two actuators 53 are preferably constituted by or include a digital motor.

In the embodiment shown the motor pulley 55 of the two actuators 53 is rotatably mounted on the frame 25 and the belts 54 extend parallel to each other and to the direction of movement in translation of the carriage 23, on the same side as the rear face of the carriage 23, between it and the frame 14 of the machine 10.

They are preferably notched belts in which case the pulleys around which they run are notched in a complementary manner.

The motor pulley 57 of each actuator 53 is rotatably mounted on the carriage 23 and the support block 62 of the jockey wheel 58 is mounted on the frame 25 so that it can move in translation.

In the embodiment shown, in each of the actuators 53, the motor pulley 55, on the one hand, and the jockey wheel 58, on the other hand, are at respective ends of the loop formed by the corresponding belts 54 and the drive pulley 57 occupies an intermediate position between the motor pulley 55 and the jockey wheel 58.

Figure 6:
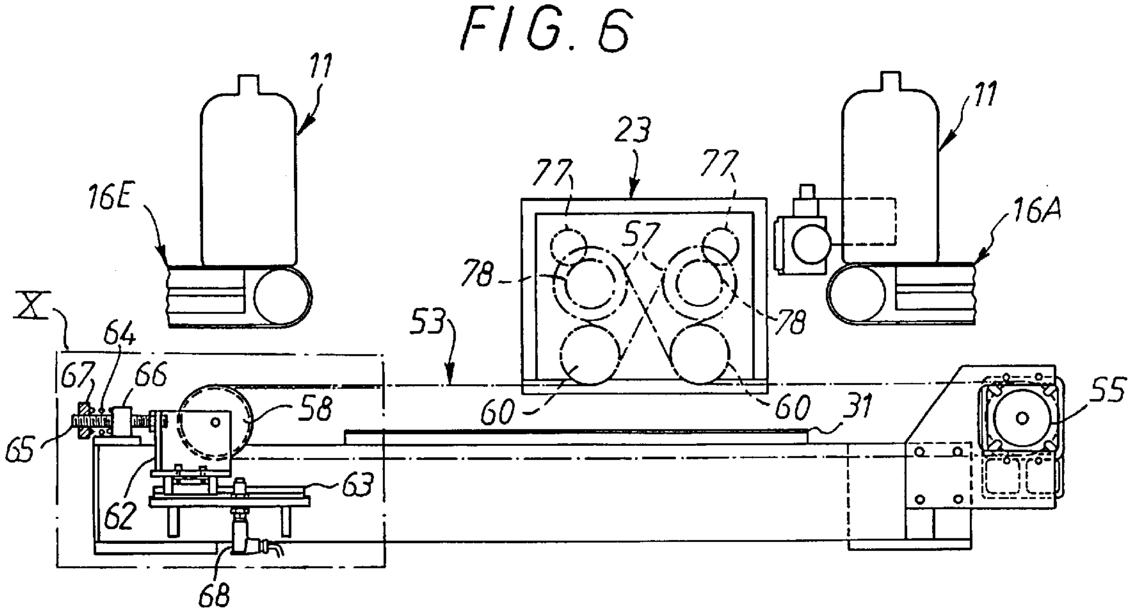
FIG. 6 is a partial rear view of it as seen in the direction of the arrow VI in FIG. 5.

In this embodiment, the motor pulley 55 and the jockey wheel 58 are in practice at the same level, the drive pulley 57 is at a level different to that of the motor pulley 55 and the jockey wheel 58 and, consequently, two additional jockey wheels 60 are provided, which, rotatably mounted on the carriage 23, flank the drive pulley 57, one on the upstream side of the drive pulley 57 and the other on its downstream side, as shown diagrammatically in FIG. 6.

As shown here, for example, the drive pulley 57 is at a higher level than the motor pulley 55 and the jockey wheel 58.

Figure 10:
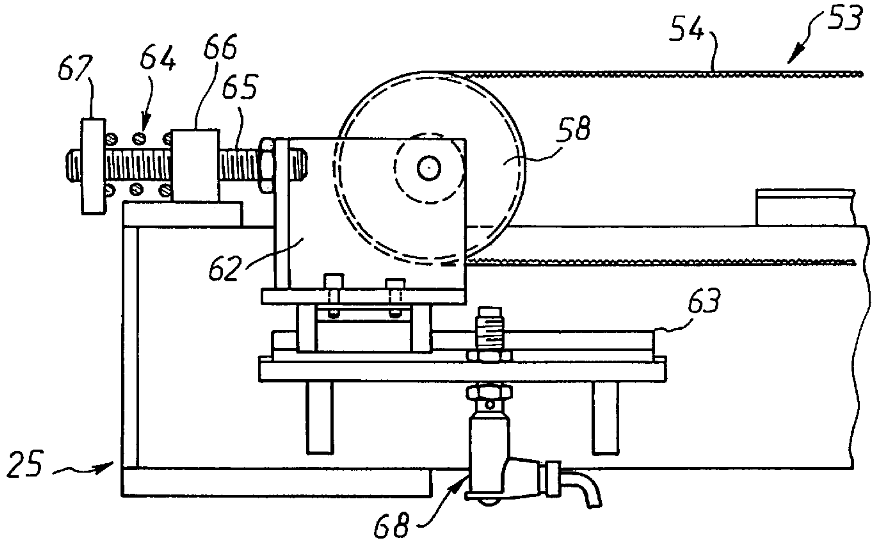
FIG. 10 shows the detail X from FIG. 6 to the same scale as FIGS. 7, 8 and 9.
Figure 11:
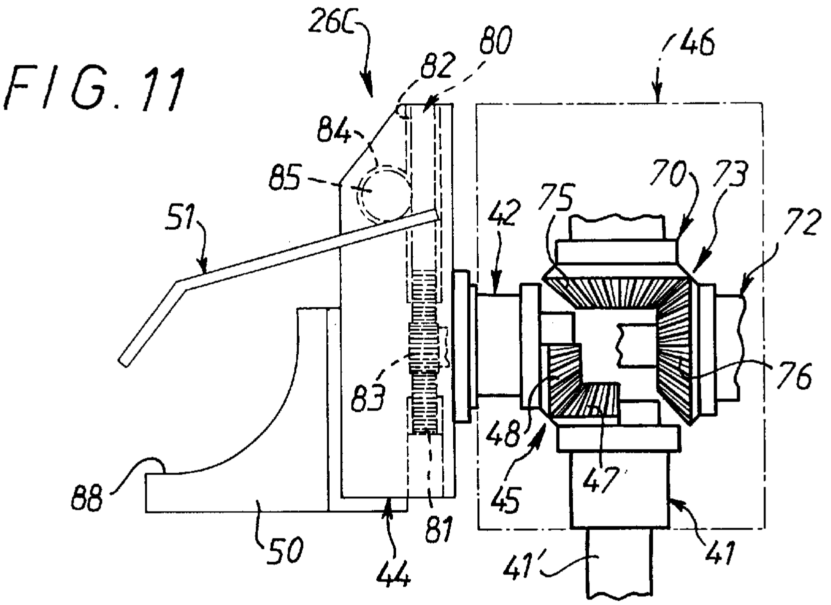
FIG. 11 is a partial plan view, derived from that of FIG. 4, showing diagrammatically the bevel gears that control the orientation of one of the transfer members equipping the loading and/or offloading device in accordance with the invention.

In the embodiment shown, and as seen more clearly in FIG. 10, the support block 62 for the jockey wheel 58 in each of the actuators 53 is mounted to move in translation on the rails 63, like a carriage, against the compensator spring means 64.

As shown here, for example, the support block 62 is coupled to a screwthreaded rod 65 which passes freely through a fixed eyelet 66 and with which an adjuster nut 67 meshes, beyond the eyelet 66, with a compression spring between the eyelet 66 and the adjuster nut 67 constituting the compensator spring means 64.

In practice the eyelet 66 is attached to the frame 25.

As is the case in the embodiment shown, a position detector 68 is preferably placed in the path of movement of the support block 62 to respond to any movement thereof beyond a particular position.

The position sensor 68 being well known in itself, and not being in itself relevant to the present invention, it will not be described here.

In the embodiment shown, the drive pulley 57 of the mobile jaw 51 of a transfer member 26C, 26D rotates with a third shaft end 70 coaxial with the first shaft end 41 and is rotatably mounted on the chassis 46 which is rotatably mounted on the shaft end and a transmission 71 described in detail hereinafter constrains the mobile jaw 51 to rotate with a fourth shaft end 72 coaxial with the second shaft end 42 and also rotatably mounted on the chassis 46, with a bevel gear 73 operating in the manner of an epicyclic gear between the third shaft end 70 and the fourth shaft end 72.

Like the first shaft end 41 and the second shaft end 42, the third shaft end 70 and the fourth shaft end 72 each have a number of sections with different diameters.

The bevel gear 73 operative between them is in practice at a position diametrally opposite the bevel gear 45 operative between the first shaft end 41 and the second shaft end 42.

Like the bevel gear 45, the bevel gear 73 comprises two bevel pinions 75, 76 which are respectively constrained to rotate with the corresponding two shaft ends 70, 72 and which mesh with each other.

Unlike the bevel pinions 47, 48 of the bevel gear 45, however, the bevel pinions 75, 76 of the bevel gear 73 extend all around the circumference.

Of course, the bevel gears 45, 73 do not interfere with each other in any manner and it is for this reason that the bevel pinions 47, 48 of the bevel gear 45 extend in each case over only a portion of the circumference.

However, their diametrally opposite positions facing each other within the chassis 46 advantageously makes the assembly extremely compact.

In each of the transfer members 26C, 26D the third shaft end 70 in practice carries a pinion 77 that meshes with a pinion 78 constrained to rotate with the drive pulley 57 of the corresponding actuator 53.

Also, in the embodiment shown, the transmission 71 operative between the mobile jaw 51 of a transfer member 26C, 26D and the corresponding fourth shaft end 72 includes a rod 79 carried by the fourth shaft end 72 which passes axially through the second shaft end 42 and extends as far as the base 44 on which the transfer member 26C, 26D operates.

In this embodiment, the transmission 71 also includes a slide 80 which, mounted to be mobile on the base 44 and, to be more precise, in the latter, carries two racks 81, 82 in two orthogonal planes (see FIGS. 11 to 14).

A pinion 83 carried by the rod 79 meshes with the rack 81 and is constrained to rotate with the fourth shaft end 72.

A pinion 84 with which a rod 85 carrying the mobile jaw 51 is constrained to rotate meshes with the rack 82.

Figure 13:
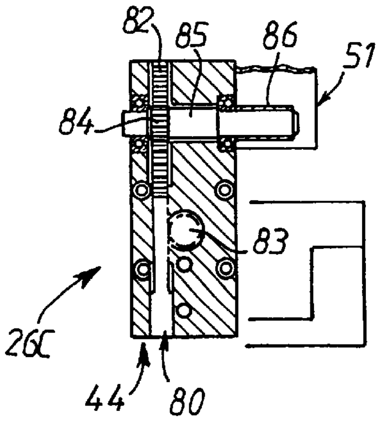
FIG. 13 is a partial view of it in section taken along the line XIII—XIII in FIG. 12.
Figure 14:
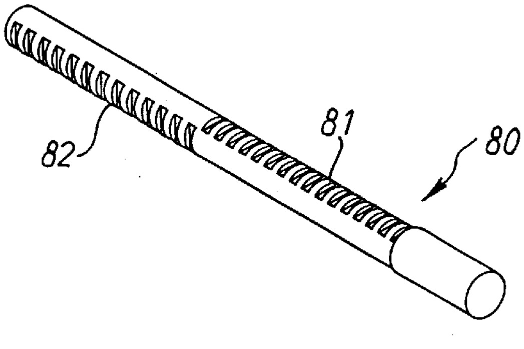
FIG. 14 is a perspective view to a different scale of a slide used in the transfer member.

As shown in FIG. 13, for example, the mobile jaw 51 is attached to a bush 86 by means of which it is sleeved on and constrained to rotate with the rod 85.

Each of the transfer members 26C, 26D is preferably removable to constitute tooling that can be changed to suit the inherent configuration of the objects 11 to be processed.

To this end all that is required is for their components, here the fixed jaw 50 and the mobile jaw 51, each to be removably attached to the base 44, the fixed jaw 50 being screwed to it, for example, and the bush 86 carrying the mobile jaw 51 being force-fitted on the rod 85 equipping the base 44, for example.

In the embodiment shown, the fixed jaw 50 is a simple solid block with a localized notch 88 against which an object 11 to be picked up bears and is located.

In the embodiment shown the notch 88 is cylindrical, with generatrices parallel to the rod 85, and its contour is globally a quarter-circle.

It can be different, however, depending on the profile of the objects 11 to be processed.

In this embodiment the mobile jaw 51 is a simple strip bent to form a dihedron near its free end and the generatrix of which is also parallel to the rod 85.

It can be different, however, depending on the profile and/or the nature of the objects 11 to be processed.

Figure 12:
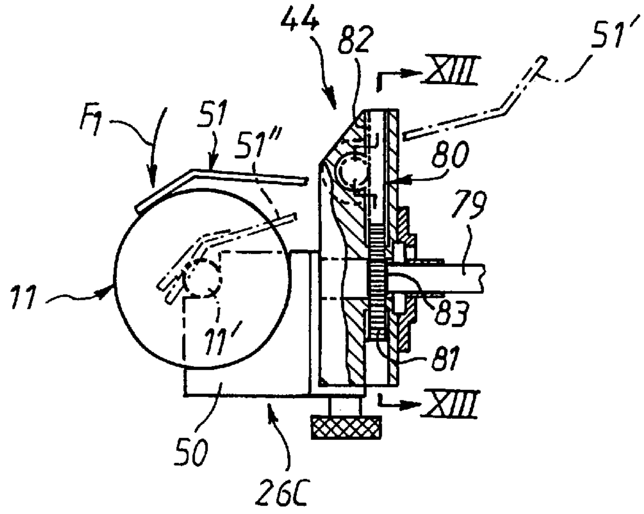
FIG. 12 is a locally cut-away plan view of the transfer member to a different scale.

As symbolized in chain-dotted line in FIG. 12, the mobile jaw 51 of each of the transfer members 26C, 26D is designed to move between two extreme positions 51', 51'', one of which is an open position and the other of which is a closed position, and which are substantially at 180° to each other.

At the start of the operating cycle of the loading and/or offloading device 18 in accordance with the invention the mobile jaw 51 of the transfer member 26C is open and the object 11 to be processed nearest the front end of the feed conveyor 16A is opposite the fixed jaw 50 of the transfer member 26C, being held in place and stabilized on the feed conveyor 16A by arrangements which, well known per se, and not relevant to the present invention, will not be described here.

The mobile jaw 51 then closes onto the object 11, as symbolized by an arrow F1 in FIG. 12, and the object 11 is then picked up, gripped between the fixed jaw 50 and the mobile jaw 51.

The carriage 23 then begins a movement from one end of the rails 31 on which it is slidably mounted to the other, as symbolized by an arrow F2 in FIG. 3. During this movement, the corresponding link 37 rotates the crank 40, and therefore the chassis 46 carried by the crank 40, through 90° about the shaft end 41, as symbolized by an arrow F3 in FIGS. 3 and 7.

During this rotation, and because of conjugate movement of the crank 40 about the shaft end 41 and rolling of the shaft end 42 relative to the shaft end 41 because of the bevel gear 45 operative between them like an epicyclic gear, the object 11 moves from its original vertical configuration to the required final horizontal configuration and, as shown in FIG. 5, it is then taken up by the holding device at the processing station 15 of the machine 10.

The corresponding actuator 53 causes the mobile jaw 51 of the transfer member 26C to return to the open position, which releases the object 11, and the released object is left with the holding device for printing.

In practice the printing occurs while the carriage 23 is returning to its original position.

During this return movement the transfer member 26D is again vertically above the holding device 20 and, by virtue of arrangements of the same type as those previously operating, its mobile jaw 51 then closes on the printed object 11, as shown in FIG. 3.

During the next operating cycle of the loading and/or offloading device 18 in accordance with the invention the object 11 picked up again is moved by the transfer member 26D to the evacuation conveyor 16E and, by a process that is the converse of the previous one, moves from its horizontal orientation at the processing station 15 of the machine 10 to the required vertical orientation on the evacuation conveyor 16E; it is then released.

Of course, in each operating cycle of the loading and/or offloading device 18 in accordance with the invention an object 11 is moved from the feed conveyor 16A to the processing station 15 of the machine 10 by the transfer member 26C at the same time as a printed object 11 is moved from the processing station 15 to the evacuation conveyor 16E by the transfer member 26D.

Movements to the corresponding open and closed positions of the mobile jaw 51 of the transfer members 26C, 26D in practice occur virtually instantaneously while the carriage 23 is stopped.

They are accordingly driven by the digital motor constituting the rotation drive means 56 of the motor pulley 55 of the corresponding actuators 53.

In practice the motor pulley 55 is constrained to rotate with the output shaft of the digital motor constituting the rotation drive means 56 which is controlled so that, each time the carriage 23 moves, there is no relative movement between the belt 54 of the actuators 53 and the corresponding drive pulley 57 during the time for which the corresponding transfer member 26C, 26D must remain closed, i.e. during the time for which the mobile jaw 51 of the transfer member 26C, 26D must be close to the associated fixed jaw 50.

In other words, the digital motor constituting the rotation drive means 56 then tracks the digital motor 33 driving the carriage 23.

Clearly, for each configuration of the object 11, the compensator spring means 64 provide optimum control of the clamping force applied to the object 11 by the mobile jaw 51 of the transfer members 26C, 26D.

All that is required for this is to adjust their tension accordingly, by operating the corresponding adjuster nut 67.

For there to remain some clamping force even for the minimal configuration of an object 11, symbolized in chain-dotted line at 11' in FIG. 12, the closed position 51'' of the mobile jaw 51 of the transfer members 26C, 26D extends beyond the contour of that minimal configuration 11', as also symbolized in chain-dotted line in FIG. 12.

What is more, in this closed position 51', which is effective only in the absence of any object 11, the position sensor 68 is activated, which stops the entire installation if a presence sensor, not shown, associated with the feed conveyor 16A shows that objects 11 to be processed are present on that conveyor.

Of course, the present invention is not limited to the embodiment described and shown, but encompasses any variant execution thereof.

In particular, instead of being rotatably mounted, the mobile jaw of one or both transfer members could be mobile in translation.

Also, instead of being mounted on the same carriage the two transfer members could be mounted on separate carriages.

Finally, only one of the transfer members could be provided if the machine concerned is loaded or offloaded in some other way, even manually.

There is claimed:

1. A loading and/or offloading device for a machine including a processing station to which objects to be processed must be presented one by one, the loading and/or offloading device comprising at least one transfer member which includes two jaws for picking up an object, one of said jaws being a fixed jaw and the other of said jaws being a mobile jaw; the mobile jaw of the transfer member being mounted to be mobile under the control of an actuator including compensator spring means having an adjustable tension;

said mobile jaw of said transfer member being rotatably mounted and its actuator including a belt looped around a plurality of pulleys, namely a motor pulley rotated by rotation drive means, a drive pulley with which the mobile jaw is constrained to rotate and at least one jockey wheel that is rotatably mounted on a support block mounted to be mobile in translation against said compensator spring means; said loading and/or offloading device further comprising tilting means adapted to move said transfer member, and consequently also the fixed and mobile jaws, from a first orientation in which said object picked up extends along a first axis to a second orientation in which said object picked up extends along a second axis perpendicular to the plane that said first axis defines with an intermediate axis orthogonal to said first axis.

2. The device claimed in claim 1, wherein the support block for the jockey wheel is coupled to a screwthreaded rod which passes freely through a fixed eyelet and which meshes beyond said eyelet with an adjuster nut, a compression spring between said eyelet and said adjuster nut constituting said compensator spring means.

3. The device claimed in claim 2 wherein said support block for said jockey wheel is mounted to move on rails in the manner of a carriage.

4. The device claimed in claim 1 wherein a position sensor is placed in the path of movement of said support block for said jockey wheel.

5. The device claimed in claim 1, wherein said belt of said actuator of said mobile jaw of said transfer member is a notched belt.

6. The device claimed in claim 1 wherein said rotation drive means of said motor pulley of said actuator of said mobile jaw of said transfer member comprise a digital motor.

7. The device claimed in claim 1 wherein said transfer member is carried by a carriage mounted to reciprocate on a frame and said belt of said actuator of said mobile jaw extends parallel to the direction of movement in translation of said carriage.

8. The device claimed in claim 7 wherein said motor pulley of said actuator of said mobile jaw of said transfer member is rotatably mounted on said frame, its drive pulley is rotatably mounted on said carriage and said support block of said jockey wheel is mounted to be mobile in translation on said frame.

9. The device claimed in claim 8 wherein said motor pulley and said jockey wheel are at respective ends of the loop formed by said belt and said drive pulley occupies an intermediate position between said motor pulley and said jockey wheel.

10. The device claimed in claim 9 wherein said motor pulley and said jockey wheel are at the same level, said drive pulley is at a different level and two additional jockey wheels are provided, rotatably mounted on said carriage, one on the upstream side of said drive pulley and the other on the downstream side of said drive pulley.

11. The device claimed in claim 1 wherein said fixed jaw of said transfer member includes a notch on which said object to be picked up bears and locates.

12. A loading and/or offloading device for a machine including a processing station to which objects to be processed must be presented one by one, said loading and/or offloading device including a carriage which is mounted to reciprocate on a frame under the control of translation drive means, at least one transfer member carried by said carriage adapted to pick up and to release an object, and tilting means to which said transfer member is slaved and which, due exclusively to the effects of movement of said carriage, are adapted to move said transfer member from a first orientation in which said object picked up extends along a first axis to a second orientation in which said object picked up extends along a second axis perpendicular to the plane that said first axis defines with an intermediate axis orthogonal to said first axis, in which device said tilting means for said transfer member include a link articulated to said frame, a crank mounted to rotate about a first shaft end prevented from rotating on said carriage and articulated to said link, a second shaft end orthogonal to said first shaft end and mounted to rotate relative to said crank, and a base carried by said second shaft end, carrying said transfer member and with a bevel gear operating in the manner of an epicyclic gear between said two shaft ends.

13. The device claimed in claim 12 wherein said crank is attached to a chassis which is mounted to rotate on said first shaft end and on which said second shaft end is rotatably mounted.

14. The device claimed in claim 12 wherein said bevel gear comprises two bevel pinions respectively constrained to rotate with said two shaft ends and meshing with each other.

15. The device claimed in claim 12 wherein said translation drive means of said carriage include a digital motor.

16. The device claimed in claim 12 wherein said frame is an individual frame separate from said frame of said machine to be equipped and adapted to be attached thereto.

17. The device claimed in claim 12 wherein said transfer member includes two jaws, one of which is fixed and the other which is mobile, and said mobile jaw is mounted to rotate under the control of an actuator including a belt looped around a plurality of pulleys, namely a motor pulley that is rotated by rotation drive means, a drive pulley with which said mobile jaw is constrained to rotate and at least one jockey wheel.

18. The device claimed in claim 12 wherein said carriage carries two transfer members side by side, one for loading and the other for offloading, with tilting means associated with each of said transfer members.

19. The device claimed in claim 13 wherein said transfer member includes two jaws, one of which is fixed and the other which is mobile, and said mobile jaw is mounted to rotate under the control of an actuator including a belt looped around a plurality of pulleys, namely a motor pulley that is rotated by rotation drive means, a drive pulley with which said mobile jaw is constrained to rotate and at least one jockey wheel.

20. The device claimed in claim 19 wherein said drive pulley of said mobile jaw of said transfer member is constrained to rotate with a third shaft end coaxial with said first shaft end, rotatably mounted on said chassis which is rotatably mounted thereon, and said mobile jaw is constrained by a transmission to rotate with a fourth shaft end coaxial with said second shaft end and rotatably mounted on said chassis, with a bevel gear operative in the manner of an epicyclic gear between said third shaft end and said fourth shaft end.

21. The device claimed in claim 20 wherein said transmission is operative between said mobile jaw of said transfer member and said fourth shaft end includes a rod carried by said fourth shaft end and passing axially through said second shaft end.

22. The device claimed in claim 20 wherein said transmission operative between said mobile jaw of said transfer member and said fourth shaft end includes a slide which carries two racks with one of which a pinion constrained to rotate with said fourth shaft end is constrained to rotate and with which meshes a pinion with which a rod carrying said mobile jaw is constrained to rotate.

23. The device claimed in claim 22 wherein said slide is mounted to be mobile on said base.

24. The device claimed in claim 19 wherein said carriage carries two transfer members side by side, one for loading and the other for offloading, with tilting means associated with each of said transfer members.

25. The device claimed in claim 24 wherein said actuators of said mobile jaw of said two transfer members share said motor pulley and its rotation drive means.

26. The device claimed in claim 12 wherein said two transfer members are of the same type.

27. The device claimed in claim 14 wherein each of said bevel pinions of said bevel gear extends over only a portion of the circumference.

28. A loading and/or offloading device for a machine including a processing station to which objects to be processed must be presented one by one, the loading and/or offloading device comprising at least one transfer member which includes two jaws for picking up an object, one of said jaws being a fixed jaw and the other of said jaws being a mobile jaw; the mobile jaw of the transfer member being mounted to be mobile under the control of an actuator including compensator spring means having an adjustable tension; said mobile jaw of said transfer member being rotatably mounted and its actuator including a belt looped around a plurality of pulleys, namely a motor pulley rotated by rotation drive means, a drive pulley with which the mobile jaw is constrained to rotate and at least one jockey wheel that is rotatably mounted on a support block mounted to be mobile in translation against said compensator spring means; said compensator spring means structured and arranged to provide optimum control of the clamping force applied to one of the objects by the mobile jaw.

* * * * *